Figure 1:
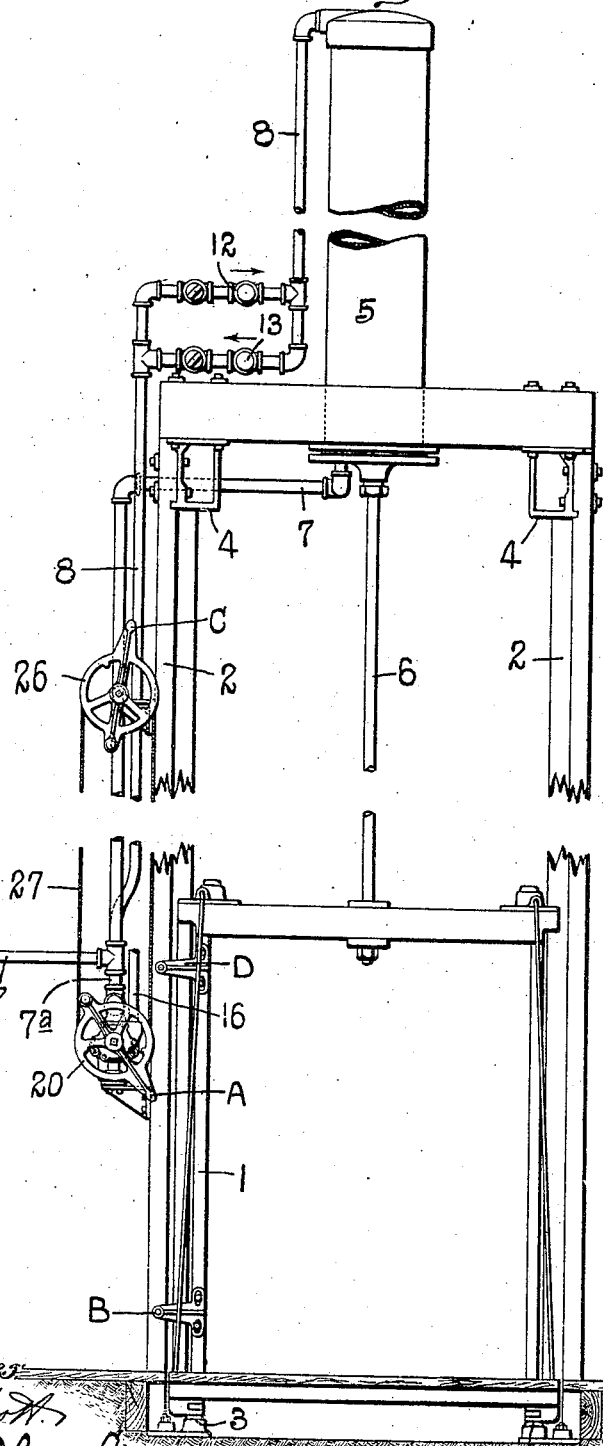

No. 848,271. PATENTED MAR. 26, 1907.
G. F. STEEDMAN.
VALVE CONTROL FOR PNEUMATIC ELEVATORS.
APPLICATION FILED MAR. 12, 1906.

4 SHEETS—SHEET 1.

Witnesses
Inventor
G. F. Steedman
by Bakewell & Cornwall
attys.

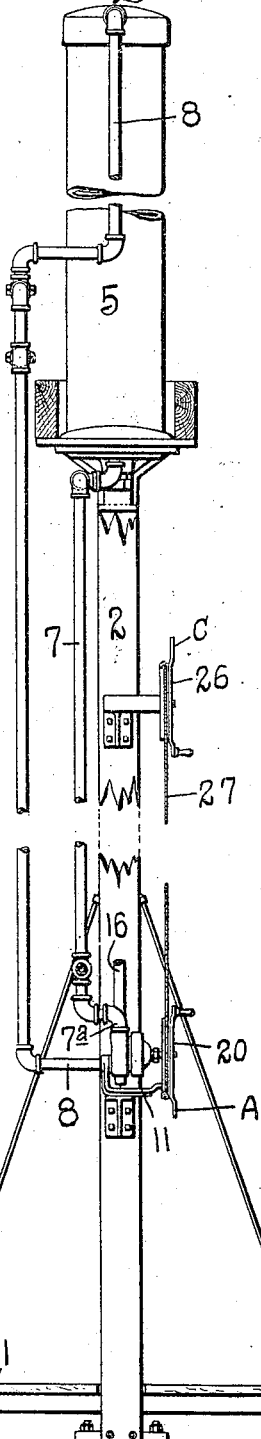

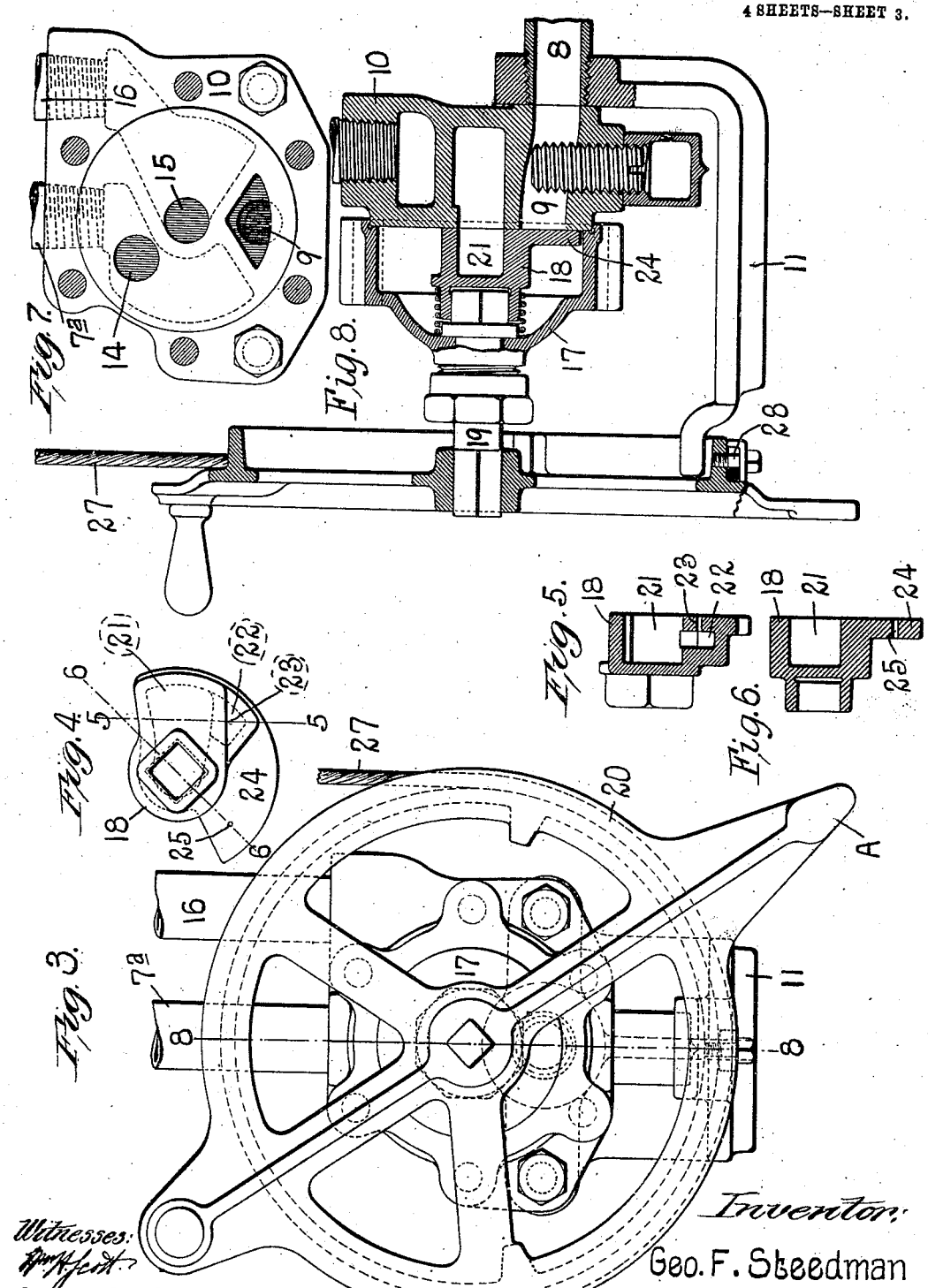

No. 848,271. PATENTED MAR. 26, 1907.
G. F. STEEDMAN.
VALVE CONTROL FOR PNEUMATIC ELEVATORS.
APPLICATION FILED MAR. 12, 1906.
4 SHEETS—SHEET 4.
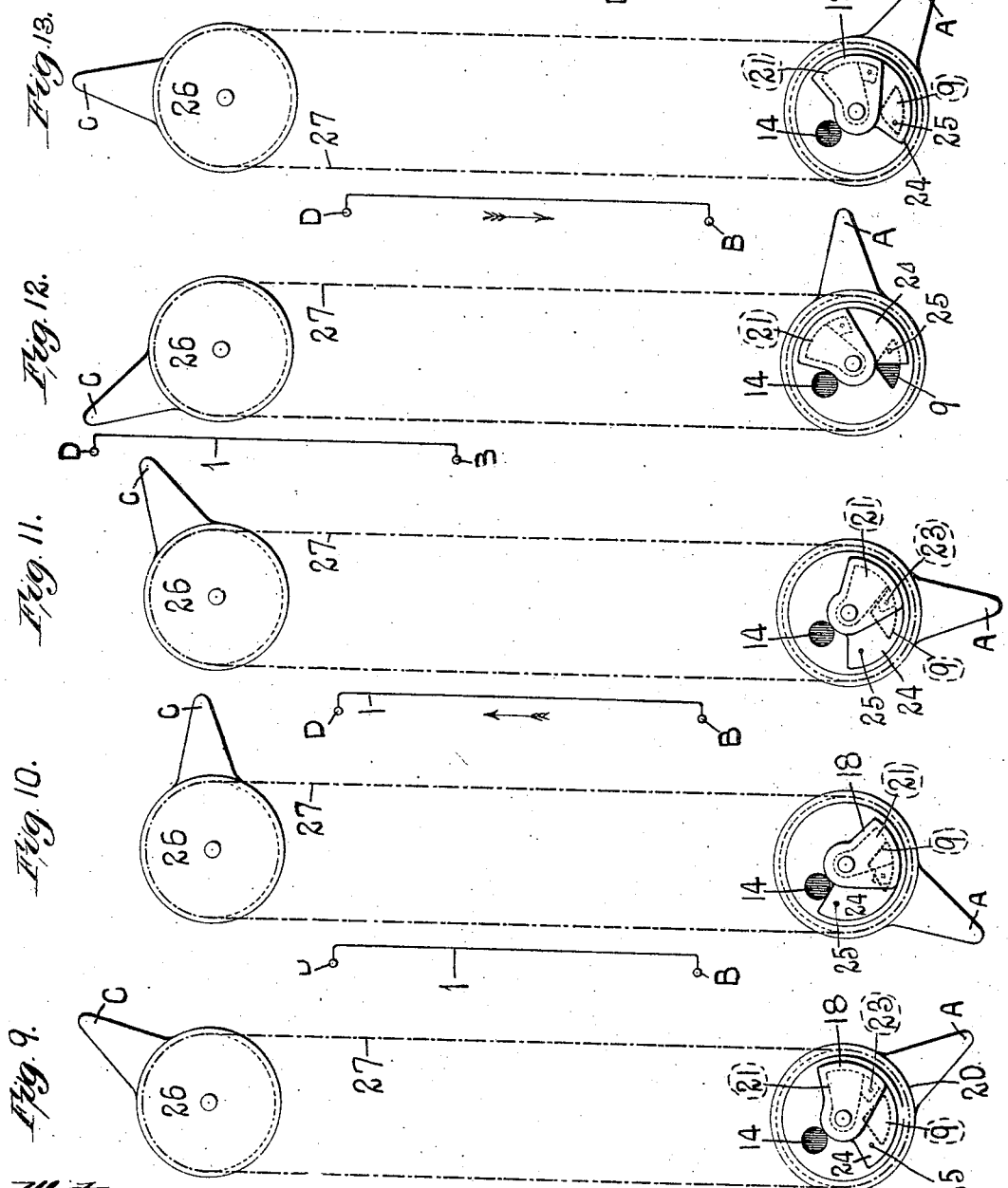
Witnesses:
A. J. McCauley.
Wells L. Church.
Inventor:
George F. Steedman
by Bakewell & Cornwall
Attys.

UNITED STATES PATENT OFFICE.

GEORGE F. STEEDMAN, OF ST. LOUIS, MISSOURI.

VALVE CONTROL FOR PNEUMATIC ELEVATORS.

No. 848,271.     Specification of Letters Patent.     Patented March 26, 1907.

Application filed March 12, 1906. Serial No. 305,654.

*To all whom it may concern:*

Be it known that I, GEORGE F. STEEDMAN, a citizen of the United States, residing at the city of St. Louis, State of Missouri, have invented a certain new and useful Improvement in a Valve Control for Pneumatic Elevators, of which the following is a full, clear, and exact description, such as will enable others skilled in the art to which it appertains to make and use the same, reference being had to the accompanying drawings, forming part of this specification, in which—

Figure 1 shows a typical arrangement of the parts forming a complete elevator. Fig. 2 is a side view of the same. Fig. 3 is a plan view of an operating-valve, which I prefer to show to illustrate the principles herein involved. Fig. 4 is a detail view of the rider or valve proper used in the valve illustrated in Fig. 3. Fig. 5 is a sectional view of the valve, taken on the line 5 5 of Fig. 4. Fig. 6 is a sectional view of the valve, taken on line 6 6 of Fig. 4. Fig. 7 is a plan view of the valve-block. Fig. 8 is a sectional view on the line 8 8 of Fig. 3. Fig. 9 is a diagram showing the position of the valve and parts of the valve-operating mechanism when the cage is arrested at a point midway the upper and lower levels. Fig. 10 is a similar view when the cage is ascending at full speed. Fig. 11 is a similar view when the cage is at the upper level. Fig. 12 is a similar view when the cage is descending at full speed, and Fig. 13 is a similar view when the cage is at the lower level.

This invention relates to a valve control for pneumatic elevators.

The object of my invention is to provide a simple adjustable means for causing the cage of an elevator to gradually come to rest as it approaches its upper and lower limits of travel.

In my pending applications, filed in the United States Patent Office December 4, 1905, and given Serial Nos. 290,179, 290,180, and 290,181, and in my prior patents, No. 752,720, dated February 23, 1904, and No. 761,790, dated June 7, 1904, I have shown elevators of the type to which this invention relates and have therein described their methods of operation. The elevators therein and herein shown have cages which travel between two positive levels. In my application serially numbered 290,179 I have shown a means for regulating the general speed of the cage movement, and in applications serially numbered 290,180 and 290,181 I have shown a cushioned means for slowing down the motion of the cage as it approaches its limits of travel. The invention herein disclosed is another way of successfully slowing down the cage as it nears its limits of travel.

My invention consists, primarily, in adjustably attaching a pair of devices, herein termed "dogs," to the elevator-cage, said dogs engaging arms on the valve-operating mechanism to actuate same for moving the valve, and after the valve has been moved to the desired position these dogs then pass out of engagement with said arms and the elevator continues its movement to the stopping-point.

It is to be understood that the general principles herein shown apply to a single-acting-cylinder, a double-acting-cylinder, or a balanced-cylinder control; but I have herein chosen to illustrate the same as applied to a balanced cylinder. A general description of these three types of cylinders has been given in my applications above mentioned and need not be herein described. It must be borne in mind, however, that in the elevator herein shown the air must be exhausted by the valve to elevate the cage and admitted by the valve to lower the cage.

Referring to the drawings, which represent the preferred form of my invention, 1 designates the cage, which travels in the frame 2, that is provided at its lower end with buffers 3 and at its upper end with buffer-engaging faces 4, which coöperate, respectively, with buffer-engaging faces and buffers carried by the cage. Connected to the upper cross member of the frame is a cylinder 5, in which a piston operates, said piston being provided with a piston-rod 6, that is connected to the elevator-cage. In communication with the lower end of the cylinder is a pipe 7, leading from a suitable source of supply of compressed air, and in communication with the upper end of the cylinder is a pipe 8, that leads to the cylinder-port 9 of the valve-block 10, which block is supported by a bracket 11, connected to the frame of the elevator. The pipe 8 is provided with a branch, as shown in Fig. 1, comprising a check-valve 12, that permits air to enter the upper end of the cylinder through said pipe, and with a check-valve 13, that permits air to exhaust from the upper end of the cylinder through said pipe. The main supply-pipe 7 has an extension 7ª, which leads to a port 14 in the valve-block 10, and said valve-block is provided with an exhaust-port 15 in communication with pipe 16, through which the air exhausts into the atmosphere.

A cap 17, forming a valve-chamber, is connected to the valve-block, as shown in Fig. 8, and in this chamber the rider or valve proper, 18, is located, said valve resting on the seat or face of the valve-block 10 and being provided with a rectangular socket, which receives a correspondingly-shaped portion on a shaft 19, having a sheave 20 connected thereto. The valve is of the form shown in Figs. 4, 5, and 6 and is provided with a recess 21, which at all times registers with the exhaust-port 15, said recess having an extension 22, which in certain positions of the valve communicates with the cylinder-port 9 through an auxiliary port 23 in the valve. The flat portion 24 of the valve is designed to cover the cylinder-port 9, and when the valve is operated to move the part 24 from over the cylinder-port the air which is continually supplied to the valve-chamber through the pipe 7$^a$ and port 14 rushes into the cylinder-port 9, and thence through pipe 8 and check-valve 12 to the upper end of the cylinder. In the portion 24 of the valve is an auxiliary port 25, the function of which will be hereinafter described.

Connected to the elevator-frame at a point above the valve is a sheave 26, and passing over said sheave and the sheave 20 is a hand-rope 27, that is prevented from slipping on said sheaves by a cap-screw 28, carried by the sheave 20, as shown in Fig. 8. The sheaves 20 and 26 are provided, respectively, with arms A and C, which at certain times are adapted to extend into the path of movement of dogs B and D, adjustably connected to the elevator-cage.

Referring to the diagram views Figs. 9 to 13, which illustrate the position of the valve relatively to the ports in the valve-block during certain positions of the elevator-cage, it will be seen that in Fig. 9 the cylinder-port 9 is covered by the portion 24 of the valve, so that no air is being admitted or exhausted from the upper end of the cylinder, the cage having been stopped midway the upper and lower levels. In Fig. 10 the valve is shown in the position which it assumes when the cage is ascending at full speed, the valve having been moved so that the recess 21 of the valve is in direct communication with the cylinder-port 15, permitting the air to rush out of the upper end of the cylinder through the pipe 8, check-valve 13, port 9, and exhaust-port 15 into the atmosphere, the upward movement of the piston of course being effected by the air which is supplied to the lower end of the cylinder through the main supply-pipe 7. It is to be noted that in this position of the valve the arm C is in the path of the upper dog D, so that as the cage nears the limit of its upward movement said dog will engage the arm C and move it into the position shown in Fig. 11, this movement imparting movement to the lower sheave and to the valve to move the same into the position shown in Fig. 11, the dog D passing by said arm C as the cage continues to move upwardly. As said dog came into engagement with said arm the speed of movement of the cage was greatly diminished, because the large recess 21 of the valve moved out of communication with the cylinder-port 9 and the exhaust of air was cut off. The auxiliary port 23, however, still remained in communication with the cylinder-port, so that the air which still remained in the upper end of the cylinder exhausted slowly through the port 23, so that the cage of the elevator came to rest gradually. It will be noted that as the dog D rotated arm C from the position shown in Fig. 10 to that shown in Fig. 11 it gradually decreased the area of communication between cylinder-port 9 and the recess 21 of the valve, due to the shape of these parts, and consequently reduced the speed of ascension from the maximum to the minimum, due to the size of the auxiliary port 23. When it is desired to have the cage descend, the hand-rope 27 is operated to rotate the valve to the left, which throws the valve and arm A into the position shown in Fig. 12. In this position the cylinder-port 9 is uncovered and air is admitted to the upper end of the cylinder. The cage descends, and as arm A is now in the path of movement of the lower dog B the continued movement of the cage causes said dog to engage and actuate the arm A to move the valve into the position shown in Fig. 13, said dog passing by said arm as the cage continues in its movement to the lower level. In changing from the position shown in Fig. 12 to the position shown in Fig. 13 the valve was rotated to the right and the area of the cylinder-port 9 gradually reduced, so that the speed of the cage was gradually diminished; but as the port 25 in the part 24 of the valve maintains a small area of communication between the compressed-air supply and the port 9 the cage continued to descend slowly until it reached the lower level.

From the foregoing description it will be seen that the period in the travel of the elevator-cage at which the cage begins to slow down is determined by the position of the dogs B and D on the cage as compared to the position of the arms A and C on the frame, and as dogs B and D are adjustably connected at the cage the period at which the cage commences to slow down can be easily varied. It will also be seen that the minimum speed at which the cage reaches its limits and stops is determined by the area of the auxiliary ports 23 and 25, and as these ports can be reamed out or partially plugged it is a simple matter to secure the minimum speed. It is possible to slow down the cage without the auxiliary ports, as either the main cylinder-port or the valve could be delicately graded or both could be graded; but this would require very careful setting of parts which would be liable to become disarranged.

It is obvious that buttons on the hand-rope and an arm on the cage coöperating with the buttons could be used in place of the arms and dogs shown herein and fairly successful results obtained by using the form of valve disclosed, but that much greater care would have to be used in the adjustment of parts. As an example, an elevator-cage traveling at a comparatively high rate of speed requires that the slowing-down effect begin when the cage is at a considerable distance from its limit of motion, while a slow traveling cage may begin to slow down comparatively near its limit of motion; but in both cases the final position of the valve should be the same. An adjustment of this kind would be difficult with buttons on the hand-rope, but simple with the dog-and-arm plan disclosed herein.

Having thus described the invention, what is claimed as new, and desired to be secured by Letters Patent, is—

1. A valve control for pneumatic elevators, consisting of a valve, mechanism for operating said valve, means on the valve-operating mechanism, and a part on the elevator-cage coöperating with said means for moving the valve in a desired position and being so arranged that it passes out of engagement with the valve-operating means before the cage comes to rest, said valve being so constructed that air can enter or escape therethrough, depending upon the direction of movement of the cage, after the valve-operating means has been actuated; substantially as described.

2. In a pneumatic elevator, a valve for admitting and exhausting air to and from the operating-cylinder, means for actuating the valve, and a part on the elevator-cage which engages said means to move the valve into a desired position and being so arranged that it passes out of engagement with said means before the cage reaches its limit of movement, said valve being so constructed that air can enter or escape therethrough, depending upon the direction of movement of the cage, after the valve-operating means has been actuated; substantially as described.

3. In a pneumatic elevator, a cage and an operating-valve controlling the admission and exhaust of air to and from the operating-cylinder, valve-operating devices adjacent to the upper and lower limits of travel of the cage, and a part on the cage adapted to coöperate with said valve-operating devices to turn the valve, said part being so arranged relatively to said devices that it passes out of engagement with same before the cage reaches its upper and lower limits of travel, said valve being so constructed that air can enter or escape therethrough, depending upon the direction of movement of the cage, after the valve-operating means has been actuated; substantially as described.

4. In a pneumatic elevator, a valve for admitting and exhausting air to and from the operating-cylinder, means for actuating the valve, a part on the cage automatically actuating said means and being so arranged that it passes out of engagement therewith as the cage nears its limits of travel, said valve being so constructed that air can enter or escape therethrough, depending upon the direction of movement of the cage, after the valve-operating means has been actuated; substantially as described.

5. In a pneumatic elevator, a valve for admitting and exhausting air to and from the operating-cylinder, means adjacent to the lower limit of travel of the cage for actuating said valve, means adjacent to the upper limit of travel of the cage for actuating said valve, and a part on the cage automatically actuating said means and being so arranged that it passes out of engagement with said means as the cage nears its limit of travel, said valve being so constructed that air can enter or escape therethrough, depending upon the direction of movement of the cage, after the valve-operating means has been actuated; substantially as described.

6. In a pneumatic elevator, a valve for admitting and exhausting air to and from the operating-cylinder, means for actuating the valve, and an adjustable part on the cage for automatically actuating said means and being so arranged that it passes out of engagement therewith as the cage nears its limits of travel, said valve being so constructed that air can enter or escape therethrough, depending upon the direction of movement of the cage, after the valve-operating means has been actuated; substantially as described.

7. In a pneumatic elevator, a valve for admitting and exhausting air to and from the operating-cylinder, means adjacent to the lower limit of travel of the cage for actuating said valve, means adjacent to the upper limit of travel of the cage for actuating said valve, and an adjustable part on the cage for automatically actuating said means and being so arranged that it passes out of engagement therewith as the cage nears its limit of travel, said valve being so constructed that air can enter or escape therethrough, depending upon the direction of movement of the cage, after the valve-operating means has been actuated; substantially as described.

8. In a pneumatic elevator, a valve for admitting and exhausting air to and from the operating-cylinder, an auxiliary port in said valve, means for actuating the valve, a part on the cage automatically actuating said means to move the auxiliary port into a desired position and passing by said means as the cage nears its limit of travel; substantially as described.

9. In a pneumatic elevator of the class described, a valve for admitting and exhausting air to and from the operating-cylinder, an auxiliary admission-port and an auxiliary exhaust-port in said valve, means for actuating said valve, a part on the cage automatically actuating said means to move the auxiliary exhaust-port into a desired position and passing by said means as the cage nears one limit of its movement; and a part on the cage for automatically actuating said means to move the auxiliary admission-port into desired position and passing by said means as the cage nears its other limit of movement; substantially as described.

10. In a pneumatic elevator of the class described, a valve for admitting and exhausting air to and from the operating-cylinder, an auxiliary admission-port and an auxiliary exhaust-port in said valve, means for actuating said valve, a part on the cage automatically actuating said means to move the auxiliary exhaust-port into a desired position as the cage nears one limit of its movement, and a part on the cage for automatically actuating said means to move the auxiliary admission-port into desired position as the cage nears its other limit of movement; substantially as described.

In testimony whereof I hereunto affix my signature, in the presence of two witnesses, this 5th day of March, 1906.

GEORGE F. STEEDMAN.

Witnesses:
   WALTER C. HECKER,
   HARRY A. HEPER.